(12) United States Patent
Jones et al.

(10) Patent No.: US 7,646,945 B2
(45) Date of Patent: Jan. 12, 2010

(54) STRUCTURAL MEMBER BEND RADIUS AND SHAPE SENSOR AND MEASUREMENT APPARATUS

(75) Inventors: Martin P. W. Jones, Southampton (GB); Richard D. G. Roberts, Southampton (GB); Ian Peirce, Southampton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/993,952

(22) Filed: Nov. 19, 2004

(65) Prior Publication Data

US 2006/0045408 A1 Mar. 2, 2006

(51) Int. Cl.
*G02B 6/00* (2006.01)
*G01L 1/24* (2006.01)

(52) U.S. Cl. ............................. 385/13; 385/12; 385/37; 73/800; 73/766

(58) Field of Classification Search ......... 385/109–111, 385/104, 12–13; 73/800, 766; 405/274; 166/250.01
See application file for complete search history.

(56) References Cited

U.S. PATENT DOCUMENTS

| | | | |
|---|---|---|---|
| 4,389,088 A * | 6/1983 | Trezequet | 385/111 |
| 4,491,386 A * | 1/1985 | Negishi et al. | 385/109 |
| 4,634,217 A | 1/1987 | Levacher et al. | |
| 4,654,520 A | 3/1987 | Griffiths | |
| 5,321,257 A | 6/1994 | Danisch | |
| 6,332,365 B1 | 12/2001 | Hodac | |
| 6,466,719 B2 * | 10/2002 | Stottlemyer et al. | 385/104 |
| 6,612,370 B1 | 9/2003 | Jahnsen et al. | |
| 6,777,947 B2 * | 8/2004 | McCoy et al. | 324/449 |
| 6,994,162 B2 * | 2/2006 | Robison | 166/250.01 |
| 2002/0001442 A1 * | 1/2002 | Couvrie et al. | 385/110 |
| 2002/0172477 A1 * | 11/2002 | Quinn et al. | 385/104 |
| 2003/0056954 A1 | 3/2003 | Headworth | |
| 2004/0035216 A1 * | 2/2004 | Morrison et al. | 73/800 |
| 2004/0206187 A1 * | 10/2004 | Williams | 73/766 |
| 2005/0283276 A1 * | 12/2005 | Prescott et al. | 700/282 |
| 2006/0115335 A1 * | 6/2006 | Allen et al. | 405/274 |

FOREIGN PATENT DOCUMENTS

FR 2 688 584 A1 9/1993
WO WO 2004/056017 A1 7/2004

OTHER PUBLICATIONS

"European Search Report", mailed Dec. 1, 2005, for Insensys Limited, Application No. 04255194.5.

* cited by examiner

*Primary Examiner*—Brian M. Healy
*Assistant Examiner*—Guy G Anderson
(74) *Attorney, Agent, or Firm*—Schlumberger

(57) ABSTRACT

Structural member bend radius sensor apparatus 90 comprises three fibre Bragg grating (FBG) strain sensors 102 provided within three optical fibres 14, 16, 18. The optical fibres 14, 16, 18 and the FBGs 102 are embedded within a part-cylindrical shaped carrier member 92. The fibres 14, 16, 18 are provided at three spaced locations across the shaped carrier member 92 so that, in use, the three respective FBG strain sensors will be located at three different angular positions around the circumference of the structural member (pipe) 68. Structural member shape measurement apparatus 100 comprises four bend radius sensor apparatus 90 provided at four bend radius measurement positions along the pipe 68. The four bend radius sensor apparatus 90 shown share their optical fibres 14, 16, 18, and a single shaped carrier member 92. The shape measurement apparatus 100 further comprises FBG interrogation apparatus 104.

15 Claims, 10 Drawing Sheets

STRUCTURAL MEMBER BEND RADIUS AND SHAPE SENSOR AND MEASUREMENT APPARATUS

This application is a U.S. National filing under 35 U.S.C §119 hereby claiming priority to EP Application No. 04255194.5, filed Aug. 27, 2004, the contents which are incorporated herein by reference for all purposes.

The invention relates to structural member bend radius sensor and measurement apparatus, and to structural member shape sensor and measurement apparatus.

In sub-sea oil and gas extraction, riser pipes carry fluids in both directions between the well head on the seabed and a platform on the surface or between two surface platforms. The platform is either fixed to the seabed or floating, being anchored to the seabed using mooring lines. When a floating vessel is used (termed an FPSO—floating production, storage and offloading vessel) the riser pipes must be able to flex to accommodate movement of the surface vessel, ocean currents and flex due to installation and retrieval of the riser.

Risers are deployed in a variety of shapes such as 'free hanging', 'steep wave' and 'U shape'. Risers are deployed in certain shapes using buoyancy devices, weights and bridges at certain locations along their length. Movements of the FPSO and the force of ocean currents causes the shape of riser pipes to change.

There is interest in monitoring the shape and bend radius of structural members, such as pipelines, for a number of reasons. The shape of a sub-sea rise pipe can indicate the location of the riser, which can be used to ensure the riser avoids subsea obstructions (such as other riser pipes). Monitoring the bend radius of a pipe can identify when the radius of the pipe approaches critical levels. Fatigue information can also be obtained by measuring the change in bend radius or shape, and fatigue analysis can help determine the remaining lifetime of the pipe. Monitoring shape of a pipe at the junction of two or more pipes can provide information about the strain conditions existing across the joint, and the fatigue life of the joint.

According to a first aspect of the invention there is provided structural member bend radius sensor apparatus comprising:

a plurality of optical fibre strain sensors; and the sensor carrier apparatus to be mechanically coupled to a structural member to be measured such that the strain sensors are located at different angular positions around the circumference of the structural member and/or at different distances from the neutral axis of the structural member.

The sensor carrier apparatus may comprise a carrier rod. The strain sensors are preferably mechanically coupled to the carrier rod at a plurality of measurement locations spaced around the surface of the carrier rod. The strain sensors may be mechanically coupled to the carrier rod at two generally opposed measurement locations. The strain sensors may alternatively be mechanically coupled to the carrier rod at three or more measurement locations substantially evenly spaced around the surface of the carrier rod.

The carrier rod is preferably formed with a generally longitudinally extending groove at a measurement location, and the respective optical fibre strain sensor is at least partially received in the groove. The optical fibre strain sensor is preferably secured in the groove by means of an adhesive. One or more optical fibre strain sensors may alternatively be fixed to the surface of the carrier rod at their respective measurement locations, preferably by means of adhesive. One or more optical fibre strain sensors may further alternatively be embedded within the carrier rod at their respective measurement locations.

The strain sensors may be provided within a single optical fibre or may be provided within a plurality of optical fibres corresponding to the number of measurement locations.

The sensor carrier apparatus may alternatively comprise a plurality of carrier rods to be mechanically coupled to the structural member at a corresponding plurality of locations spaced around the circumference of the structural member. Preferably, two carrier rods are to be mechanically coupled to the structural member at two generally opposed locations on the structural member. Alternatively, three or more carrier rods may be mechanically coupled to the structural member at a corresponding three or more locations substantially equally spaced around the circumference of the structural member.

Preferably, at least one optical fibre strain sensor is provided on each carrier rod. The optical fibre strain sensors are preferably embedded within their respective carrier rods. The optical fibre strain sensors may alternatively be fixed to the surface of their respective carrier rods. The optical fibre strain sensors preferably extend generally longitudinally along their respective carrier rod.

The strain sensors may be provided within a single optical fibre or may be provided within a plurality of optical fibres corresponding to the number of carrier rods.

The or each carrier rod is preferably to be located on the structural member such that it extends generally longitudinally along the structural member. The or each carrier rod may alternatively to be wound around the structural member, and is preferably to be generally helically wound around the structural member. The or each carrier rod may be a rod of a composite material, a plastics material, or a resin material The sensor carrier apparatus preferably additionally comprises coupling apparatus for coupling the or each carrier rod to a structural member. The coupling apparatus preferably comprises mechanical fixing means, such as mechanical clamp apparatus.

The sensor carrier apparatus may further alternatively comprise a shaped carrier member. The shaped carrier member is preferably at least part-cylindrical in shape. The shaped carrier member is preferably part-circular in cross-section, and may be less than semi-circular in cross-section. The sensor carrier apparatus may alternatively comprise two substantially hemi-cylindrical shaped carrier members.

The sensor carrier apparatus preferably additionally comprises coupling apparatus for coupling the or each shaped carrier member to a structural member. The coupling apparatus preferably comprises mechanical fixing means, such as mechanical clamp apparatus.

The or each shaped carrier member is preferably flexible compared to the structural member to which it is to be coupled. The or each shaped carrier member may be constructed from a composite material, such as glass fibre or carbon fibre in an epoxy resin or a polyester resin, or may be constructed from a plastics material.

The or each shaped carrier member preferably has a complimentary internal radius to the external radius of the structural member to which it is to be coupled, such that the or each shaped carrier member will closely fit around the structural member.

The strain sensors are preferably provided on the or each shaped carrier member at a plurality of locations spaced across the or each shaped carrier member.

The strain sensors are preferably embedded within the or each shaped carrier member. The strain sensors may alternatively be provided on a surface of the or each shaped carrier member.

One or more of the optical fibre strain sensors preferably comprises a fibre grating strain sensor. The fibre grating strain sensor may be a fibre Bragg grating or may be a fibre Bragg grating Fabry-Perot etalon. One or more of the optical fibre strain sensors may alternatively comprise an optical fibre Fabry-Perot etalon. Each grating or etalon may have substantially the same resonant wavelength or may have a different resonant wavelength.

The structural member bend radius sensor apparatus may further comprise a duplicate set of optical fibre strain sensors provided generally along side the optical fibre strain sensors to provide for sensor redundancy within the apparatus.

According to a second aspect of the invention there is provided structural member shape sensor apparatus comprising:
  a plurality of structural member bend radius sensor apparatus according to the first aspect of the invention, each bend radius sensor apparatus to be located at a different position along a structural member.

Where the sensor carrier apparatus comprises a carrier rod, a single carrier rod may be used to carry the optical fibre strain sensors for each of the plurality of bend radius sensor apparatus.

Where the sensor carrier apparatus comprises two carrier rods, a single set of two carrier rods be used to carry the optical fibre strain sensors for each of the plurality of bend radius sensor apparatus.

Where the sensor carrier apparatus comprises three or more carrier rods, a single set of three or more carrier rods be used to carry the optical fibre strain sensors for each of the plurality of bend radius sensor apparatus.

Where the sensor carrier apparatus comprises one or more shaped carrier members, a single shaped carrier member or a single set of shaped carrier members may be used to carry the optical fibre strain sensors for each of the plurality of bend radius sensor apparatus.

According to a third aspect of the invention there is provided structural member bend radius measurement apparatus comprising:
  structural member bend radius sensor apparatus according to the first aspect of the invention; and
  optical fibre strain sensor interrogation apparatus to which the optical fibre strain sensors are optically coupled, the interrogation apparatus being operable to optically interrogate the optical fibre strain sensors.

The interrogation apparatus is preferably further operable to convert measured strains into a bend radius.

The interrogation apparatus may be located locally to the bend radius sensor apparatus, and may be attached to the sensor carrier apparatus.

According to a fourth aspect of the invention there is provided structural member shape measurement apparatus comprising:
  structural member shape sensor apparatus according to the second aspect of the invention; and
  optical fibre strain sensor interrogation apparatus to which the optical fibre strain sensors are optically coupled, the interrogation apparatus being operable to optically interrogate the optical fibre strain sensors.

The interrogation apparatus is preferably further operable to convert measured strains into bend radii, and to convert the bend radii into the shape of the structural member.

The interrogation apparatus may be located locally to the shape sensor apparatus, and may be attached to the sensor carrier apparatus.

According to a fifth embodiment of the invention there is provided structural member joint monitoring apparatus comprising:
  structural member shape sensor apparatus according to the second aspect of the invention,
    the apparatus to be provided on one structural member of the joint to be monitored; and
  optical fibre strain sensor interrogation apparatus to which the optical fibre strain sensors are optically coupled,
    the interrogation apparatus being operable to optically interrogate the optical fibre strain sensors and to convert measured strains into bend radii,
    the interrogation apparatus is further operable to convert the bend radii into the shape of the structural member and, from the shape of the structural member, to calculate the strain present across the joint.

The joint may be a straight joint between two structural members, the shape sensor apparatus being provided on either structural member forming the joint. The joint may alternatively be a T-joint between three structural members, the shape sensor apparatus preferably being provided on the generally perpendicular structural member.

The interrogation apparatus may be located locally to the joint, and may be attached to the sensor carrier apparatus.

The or each structural member may comprise a section of pipeline. The pipeline may be a sub-sea pipeline, and may be a sub-sea oil pipeline or gas pipeline.

Embodiments of the invention will now be described in detail, by way of example only, with reference to the accompanying drawings, in which.

Figure 1:
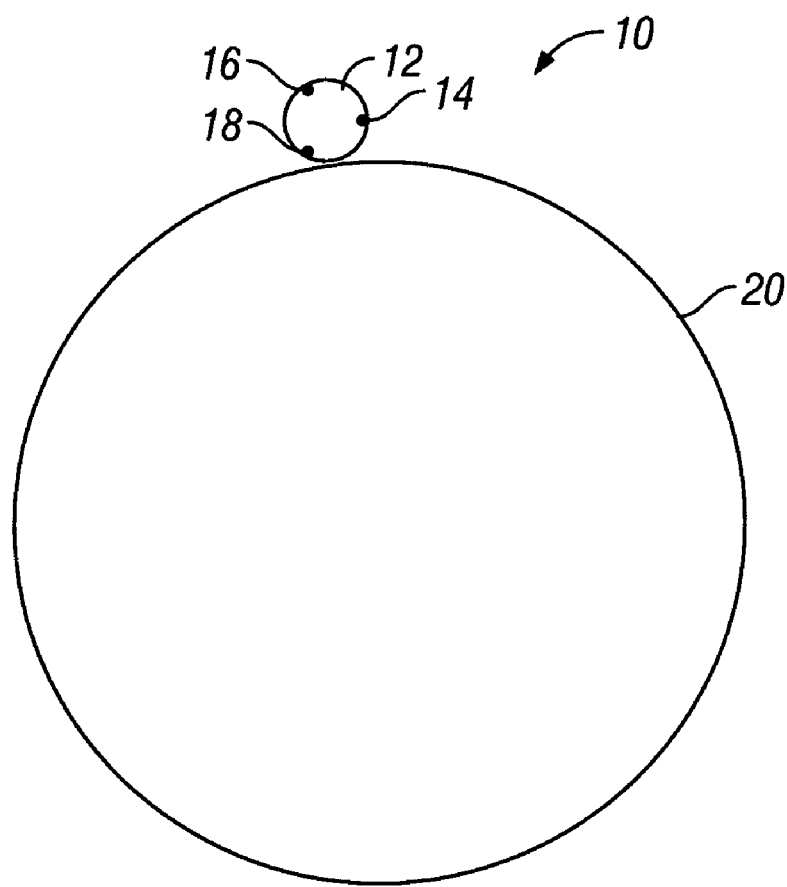
FIG. 1 is a diagrammatic cross-sectional representation of structural member bend radius sensor apparatus according to a first embodiment of the invention, shown in use on a structural member.

Referring to FIG. 1, a first embodiment of the invention provides structural member bend radius sensor apparatus 10. The apparatus 10 comprises three optical fibre strain sensors (not shown in FIG. 1), which in this example take the form of fibre Bragg gratings (FBGs), each having a resonant wavelength of 1550 nm and a spectral linewidth of 0.07 nm, and sensor carrier apparatus in the form of a carrier rod 12, having a circular cross-section. The carrier rod 12 is a rod of epoxy resin, having a diameter of ~5 mm.

The FBG strain sensors are respectively provided in three optical fibres 14, 16, 18. The optical fibres 14, 16, 18 are embedded within the carrier rod 12, such that the fibres 14, 16, 18, and thus the FBGs, extend generally longitudinally along the carrier rod 12. The fibres 14, 16, 18 are embedded close to the surface of the carrier rod 12 and are substantially equally spaced from one another around the carrier rod 12.

The FBG strain sensors are thereby mechanically coupled to the carrier rod 12 at three measurement locations located generally within a single cross-sectional plane of the carrier rod 12, and are equally spaced around the surface of the carrier rod 12.

In use, the carrier rod 12 is mechanically coupled, for example by means of mechanical clamps, to a structural member the radius of which is to be measured or monitored. In this example the structural member takes the form of a sub-sea riser pipe 20.

Due to the spaced locations of the fibres 14, 16, 18 around the surface of the carrier rod 12, the FBG strain sensors are located at different angular positions around the circumference of the riser pipe 20, and at different distances from the central (neutral) axis of the riser pipe 20.

A single strain sensor located at a single measurement location offset from the neutral axis of a structural member can be used to measure the bend radius of the structural member. However, structural members, such as pipelines, are often simultaneously exposed to axial strain and strain due to bending, and a single strain sensor can not discriminate between these two strain sources.

By using two or more strain sensors provided at spaced measurement locations around the circumference of the structural member, it is possible to discriminate between axial strain and bending in different directions. For example, axial strain can be determined from the average of 2 strain sensors arranged generally opposite each other. Bending can be determined from the difference in strain measured by the two sensors and the distance between the strain sensors.

Using three strain sensors provided at three measurement locations around the circumference of the structural member enables bending information in 2 dimensions to be obtained, provided that the three strain sensors are not all located within a single longitudinal plane through the structural member.

The strain sensors should preferably be located within a single cross-sectional plane through the structural member, in order to measure bending within that plane. However, it will be appreciated that structural members such as pipelines can have a large diameter and a long length, meaning that the strain conditions change extremely slowly along the pipeline. As a result, the strain sensors within a single bend radius sensor do not actually have to lie within a single cross-sectional plane through the pipeline, but can in fact be offset from that plane without causing any noticeable deterioration in the accuracy of the bend radius and/or axial strain measurements.

For a point offset by a distance dr from the neutral axis of a structural member, the strain $\epsilon$ is given by $$\epsilon = dr/R$$

where R is the local radius of curvature of the structural member. If the distance of a strain sensor from the neutral axis is known, then the strain measurement can be converted to a local radius of curvature. For example, for a 0.25 m radius riser pipe with a strain sensor on the outside measuring 1000 $\mu\epsilon$ (0.001) the local radius of curvature is 250 m.

For a 10 mm diameter rod containing 4 fibres located on the surface of the same riser, the difference in strain values will be $$dR/R = 0.01/250 = 0.00004 \text{ or } 40 \text{ microstrain}$$

This difference in strain can be used to measure the local bend radius of the pipe. If both sensors increase or decrease together (common mode response) this can be used to measure the axial strain in the pipe.

Where bending occurs in 2 dimensions and 3 or more strain sensors are used, as illustrated in FIG. 1(*a*), the bend radius of the pipe 20 in orthogonal directions $R_{90}$ and $R_0$ can be determined using the following equations:

$$R_{90} = \frac{\frac{\cos(v_3) - \cos(v_2)}{\sin(v_3) - \sin(v_2)} - \frac{\cos(v_2) - \cos(v_1)}{\sin(v_2) - \sin(v_1)}}{\frac{\varepsilon_3 - \varepsilon_2}{r[\sin(v_3) - \sin(v_2)]} - \frac{\varepsilon_2 - \varepsilon_1}{r[\sin(v_2) - \sin(v_1)]}}$$

$$R_0 = \frac{r[\sin(v_2) - \sin(v_1)]}{\varepsilon_2 - \varepsilon_1 - \frac{r[\cos(v_2) - \cos(v_1)]}{R_{90}}}$$

where $v_1$ is the angular position of the first FBG strain sensor, $v_2$ is the angular position of the second FBG strain sensor, $v_3$ is the angular position of the third FBG strain sensor, r is the radius of the pipe, $\epsilon_1$ is the strain measured by the first FBG strain sensor, $\epsilon_2$ is the strain measured by the second FBG strain sensor and $\epsilon_3$ is the strain measured by the third FBG strain sensor.

Figure 2:
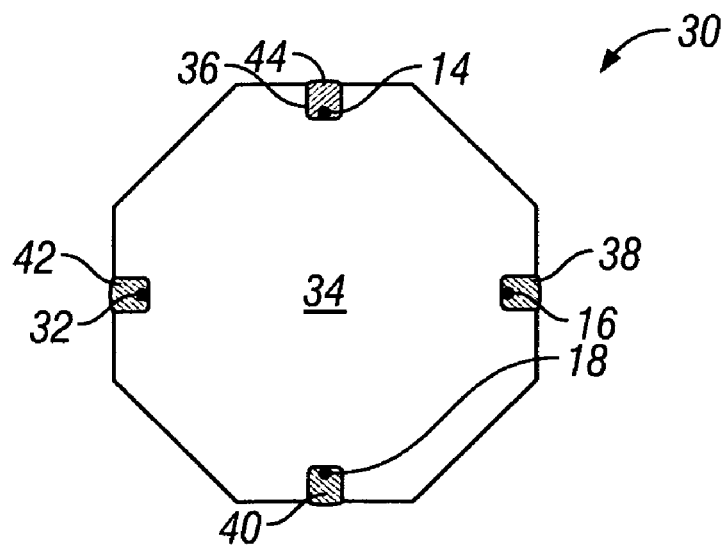
FIG. 2 is a diagrammatic cross-sectional representation of structural member bend radius sensor apparatus according to a second embodiment of the invention.
Figure 1A:
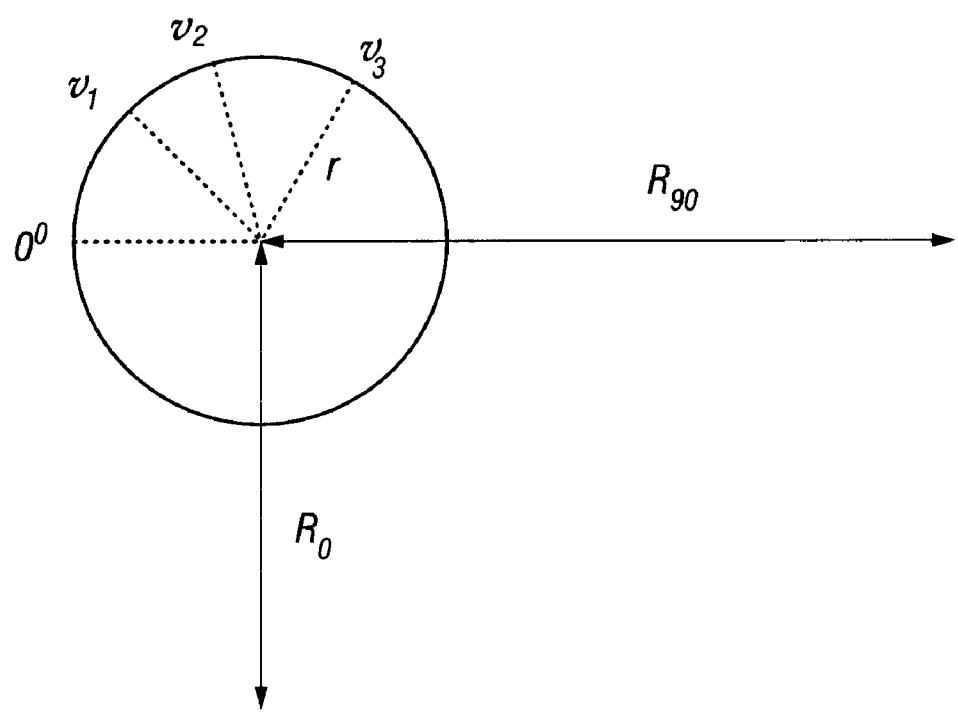

FIG. 2 shows structural member bend radius sensor apparatus 30 according to a second embodiment of the invention. The bend radius sensor apparatus 30 of this embodiment is substantially the same as the apparatus 10 of the first embodiment, with the following modifications. The same reference numbers are retained for corresponding features.

In this embodiment four FBG strain sensors are respectively provided within four optical fibres 14, 16, 18, 32. The carrier rod 34 has an octagonal cross-section in this example.

The fibres 14, 16, 18, 32 are respectively located within four longitudinally extending channels 36, 38, 40, 42 provided on two opposing sets of the eight faces of the carrier rod 34. The fibres 14, 16, 18, 32 are fixed within the channels 36, 38, 40, 42 by means of adhesive 44, thereby mechanically coupling the fibres 14, 16, 18, 32, and thus the FBG strain sensors, to the carrier rod 34.

The addition of a fourth FBG strain sensor around the surface of the carrier rod 34 improves the accuracy of the bend radius measurements made using the apparatus 30, and provides for redundancy should one of the fibres 14, 16, 18, 32 fail.

Figure 3:
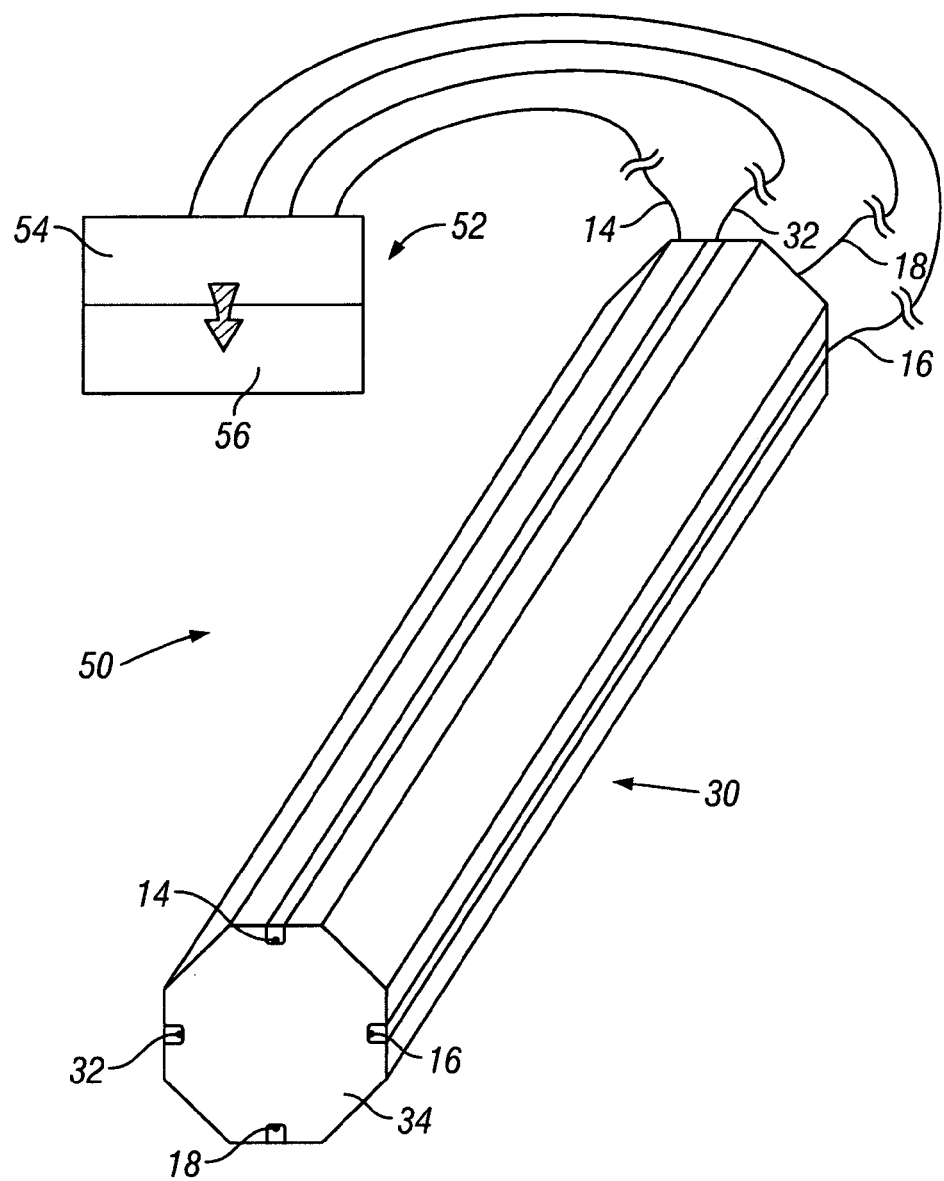
FIG. 3 is a diagrammatic representation of structural member bend radius measurement apparatus, incorporating the bend radius sensor apparatus of FIG. 2, according to a third embodiment of the invention.

Bend radius measurement apparatus 50 according to a third embodiment of the invention is shown in FIG. 3. The bend radius measurement apparatus 50 comprises bend radius sensor apparatus 30 as shown in FIG. 2 and optical fibre strain sensor interrogation apparatus 52. The optical fibre strain sensor interrogation apparatus 52 comprises FBG interrogation apparatus 54, operable to optically interrogate the FBG strain sensors, and processor means 56.

The optical fibres 14, 16, 18, 32, and thus the FBG strain sensors, are optically coupled to the FBG interrogation apparatus 54. Suitable FBG interrogation apparatus will be well known to the person skilled in the art, and will not be described in detail here. One particularly suitable FBG interrogation apparatus is described in International patent application number PCT/GB2003/005497.

The wavelength information measured by the FBG interrogation apparatus 54 is passed to the processor means 56, which is operable to convert the wavelength information into the axial strain and bend induced strain experience by the FBG strain sensors, and thus into the radius of a structural member (not shown) to which the carrier rod 34 is mechanically coupled.

Figure 4:
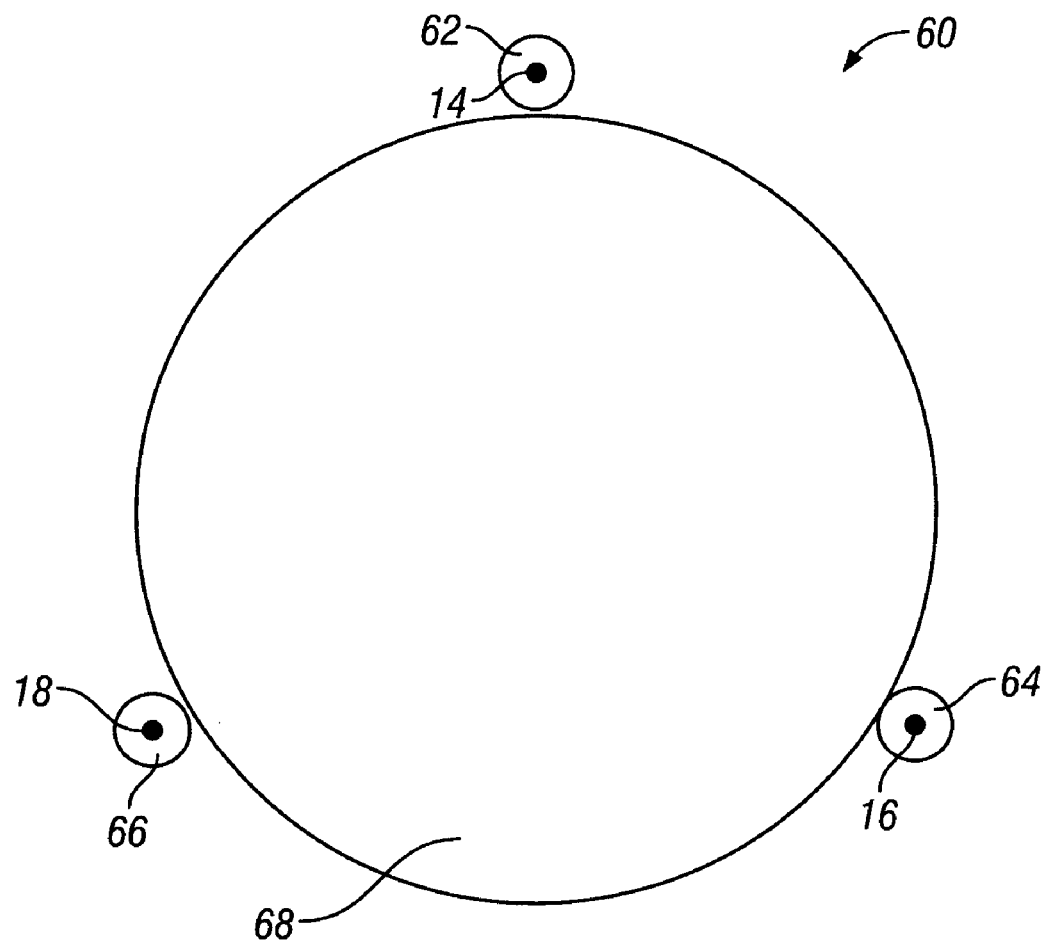
FIG. 4 is a diagrammatic cross-sectional representation of structural member bend radius sensor apparatus according to a fourth embodiment of the invention, shown in use on a structural member.

Structural member bend radius sensor apparatus 60 according to a fourth embodiment of the invention is shown in FIG. 4. The apparatus 60 of this embodiment is substantially the same as the apparatus of FIG. 1, with the following modifications. The same reference numerals are retained for corresponding features.

In this embodiment the sensor carrier apparatus takes the form of three carrier rods 62, 64, 66, each of generally circular cross-section. The three optical fibres 14, 16, 18 are respectively embedded within the three carrier rods 62, 64, 66 and extend generally axially through their respective carrier rods 62, 64, 66.

In use, the carrier rods 62, 64, 66 are mechanically coupled, for example by means of mechanical clamps, to a structural member the radius of which is to be measured or monitored. In this example the structural member takes the form of a sub-sea umbilical pipe 68.

The carrier rods 62, 64, 66 are to be substantially equally spaced around the circumference of the pipe 68, so that the FBG strain sensors are provided at three measurement locations, at three angular positions around the pipe 68.

Figure 5:
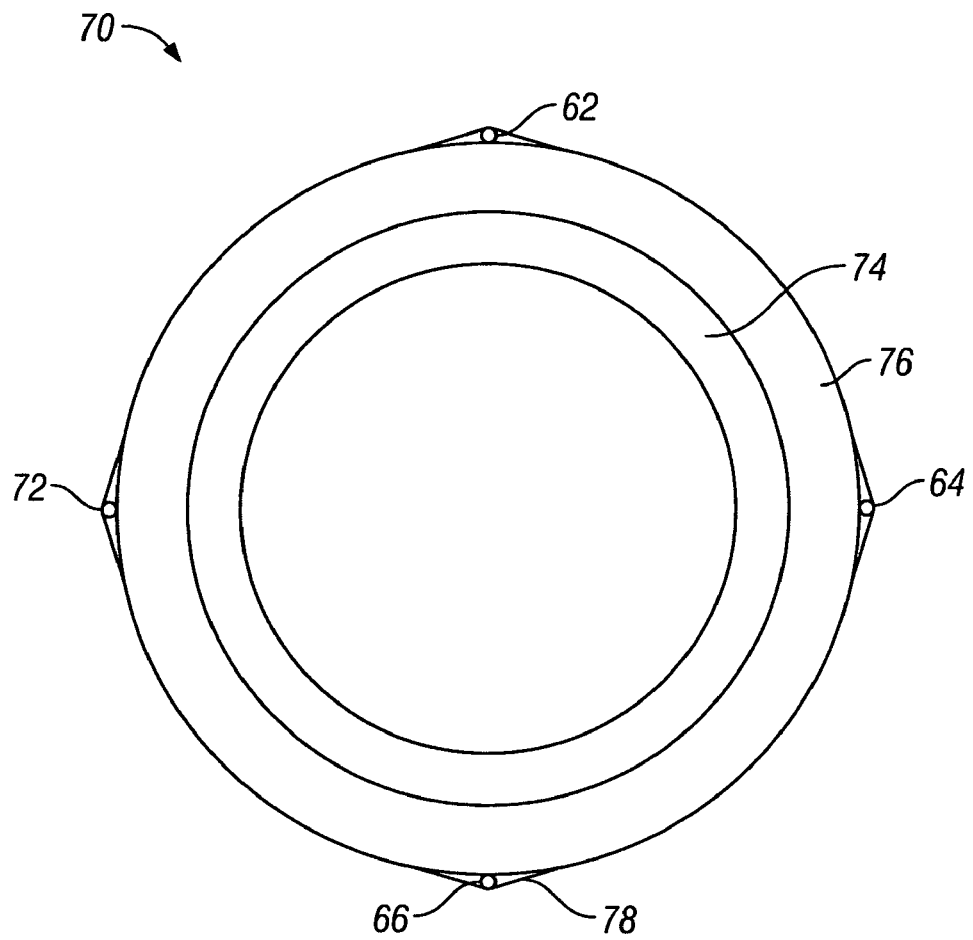
FIG. 5 is a diagrammatic cross-sectional representation of structural member bend radius sensor apparatus according to a fifth embodiment of the invention, shown in use on a structural member.

Structural member bend radius sensor apparatus 70 according to a fifth embodiment of the invention is shown in FIG. 5. The apparatus 70 of this embodiment is substantially the same as the apparatus of FIG. 4, with the following modifications.

In this embodiment, a fourth FBG strain sensor is additionally provided, within a fourth optical fibre. The fourth fibre is embedded within a fourth carrier rod 72, and extends generally axially through the rod 72.

In this example, the bend radius sensor apparatus 70 is to be used with a sub-sea riser pipe 74, which is provided with an outer cladding coating 76. The carrier rods 62, 64, 66, 72 are substantially evenly spaced around the circumference of the cladding 76, in two sets of generally opposed pairs 62, 66 and 64, 72. The carrier rods 62, 64, 66, 72 are fixed in placed, and mechanically coupled to the riser pipe 74, by means of pipe wrapping 78, in the form of carbon fibres helically wound around the cladding 76 and carrier rods 62, 64, 66, 72.

Figure 6:
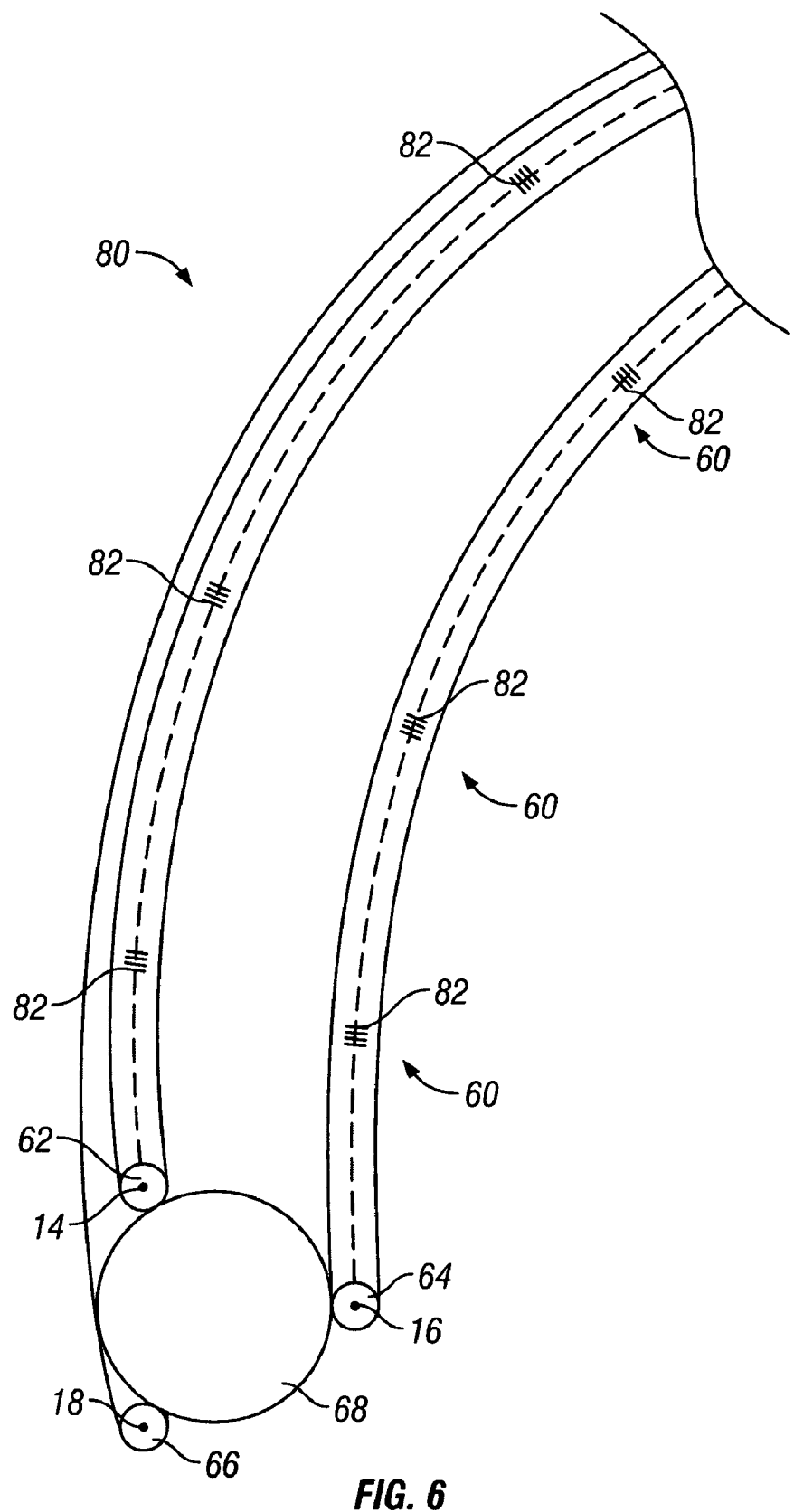
FIG. 6 is a diagrammatic representation of structural member shape sensor apparatus according to a sixth embodiment of the invention, shown in use on a structural member.

FIG. 6 shows structural member shape sensor apparatus 80 according to a sixth embodiment of the invention. The shape sensor apparatus 80 comprises a plurality of bend radius sensor apparatus 60 (only three are shown for clarity) according to the fourth embodiment of the invention. The same reference numbers are retained for corresponding features.

The three bend radius sensor apparatus 60 are spaced apart from one another, at three bend radius measurement positions along the pipe 68. The three bend radius sensor apparatus 60 shown share their optical fibres 14, 16, 18 and their carrier rods 62, 64, 66, rather than each bend radius sensor apparatus 60 having its own separate fibres and carrier rods, thus simplifying the structure of the shape sensor apparatus 80.

In the section of the shape sensor apparatus 80 shown, each carrier rod 62, 64, 66 therefore has three FBG strain sensors 82 provided within it, at three axially spaced bend radius measurement positions.

In use, the bend radii determined by the three bend radius sensor apparatus 60 are used to determine the shape of the pipe 68 to which the shape sensor apparatus 80 is coupled. The bend radii can also be used to determine the fatigue lifetime of the pipe 68.

Figure 7:
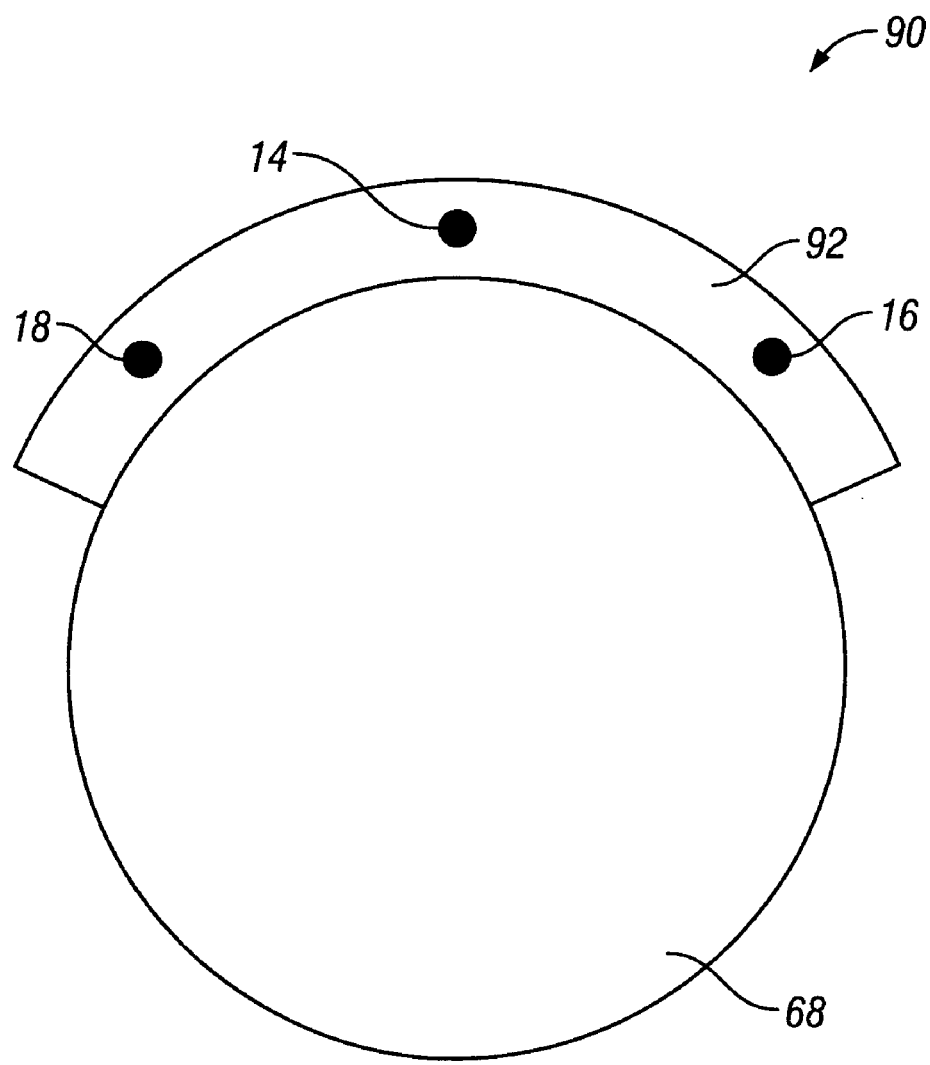
FIG. 7 is a diagrammatic cross-sectional representation of structural member bend radius sensor apparatus according to a seventh embodiment of the invention, shown in use on a structural member.

A seventh embodiment of the invention, shown in FIG. 7, provides bend radius sensor apparatus 90 which is substantially the same as the bend radius sensor apparatus 60 of the fourth embodiment, with the following modifications. The same reference numbers are retained for corresponding features.

In this embodiment, the sensor carrier apparatus takes the form of a shaped carrier member 92. The shaped carrier member 92 comprises a moulded sheet of glass fibre/epoxy resin composite material, having a thickness of 8 mm, which is flexible relative to the pipe 68. The shaped carrier member 92 is part cylindrical in shape, being part-circular in cross-section and extending for less than 180 degrees of a circle. The internal radius of curvature of the shaped carrier member 92 matches the external radius of curvature of the pipe 68 to which the shaped carrier member 92 is to be coupled in use, as shown in FIG. 7. This is so that a close mechanical coupling may be achieved between the shaped carrier member 92 and the pipe 68.

In this embodiment, the optical fibres 14, 16, 18 containing the FBG strain sensors are embedded within the shaped carrier member 92. The fibres 14, 16, 18 are arranged to extend generally longitudinally through the shaped carrier member 92. The fibres 14, 16, 18 are provided at three spaced locations across the shaped carrier member 92 so that, in use, the three respective FBG strain sensors will be located at three different angular positions around the circumference of the pipe 68.

The shaped carrier member 92 is held in place on the pipe 92 by means of mechanical clamps (not shown in FIG. 7).

Figure 8:
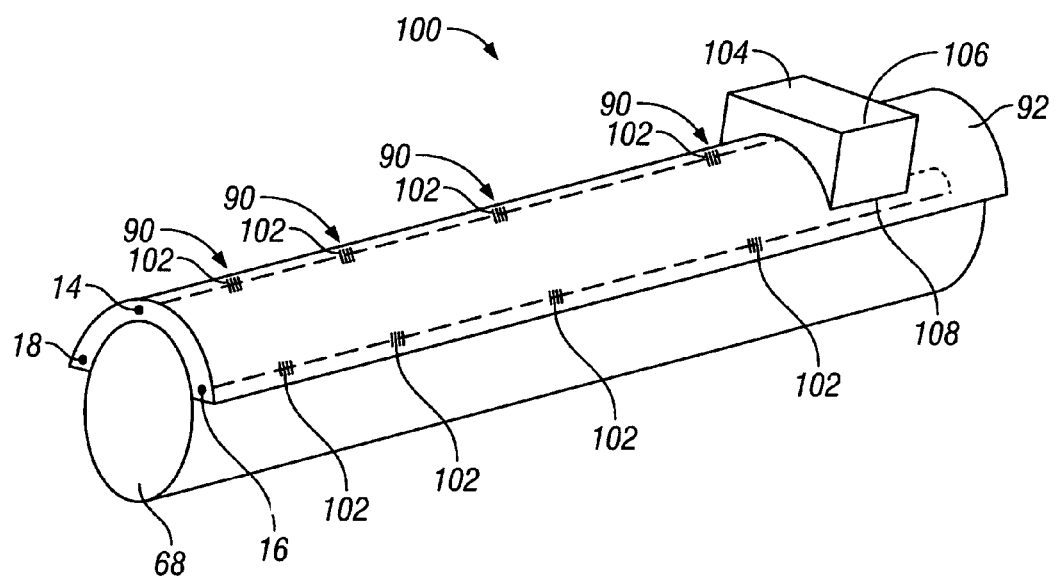
FIG. 8 is a diagrammatic representation of structural member shape measurement apparatus according to an eighth embodiment of the invention, incorporating structural member shape sensor apparatus comprising four sets of the bend radius sensor apparatus of FIG. 7.

FIG. 8 shows structural member shape measurement apparatus 100 according to an eighth embodiment of the invention. The shape measurement apparatus 100 comprises four bend radius sensor apparatus 90 according to the seventh embodiment of the invention. The same reference numbers are retained for corresponding features.

The four bend radius sensor apparatus 90 are spaced apart from one another, at four bend radius measurement positions along the pipe 68. The four bend radius sensor apparatus 90 shown share their optical fibres 14, 16, 18, with four FBG strain sensors 102 being provided in each fibre. The fibres 14, 16, 18 are embedded within a single shaped carrier member 92, which is part-cylindrical in shape.

The shape sensor apparatus 100 therefore has twelve FBG strain sensors 102 provided within the shaped carrier member 92, provided at twelve axially and angularly different measurement locations.

The apparatus 100 further comprises optical fibre strain sensor interrogation apparatus in the form of FBG interrogation apparatus 104, to which the optical fibres 14, 16, 18, and thus the FBGs 102, are optically coupled. The interrogation apparatus 104 is operable to optically interrogate the FBG strain sensors 102. Suitable FBG interrogation apparatus will be well known to the person skilled in the art, and will not be described in detail here. One particularly suitable FBG interrogation apparatus is described in International patent application number PCT/GB2003/005497.

The optical fibre strain sensor interrogation apparatus further comprises processor means 106, in communication with the FBG interrogation apparatus 104, operable to convert measured wavelengths into strains, strains into bend radii, and bend radii into the shape of the pipe 68. The processor means 106 is also operable to determine the fatigue lifetime of the pipe 68 from the bend radii.

In this embodiment, the FBG interrogation apparatus 104 is provided within a housing unit 108, mounted on the shaped carrier member 92. The FBG interrogation apparatus 104 may alternatively be located remote from the pipe 68 and the shaped carrier member 92.

Figure 9:
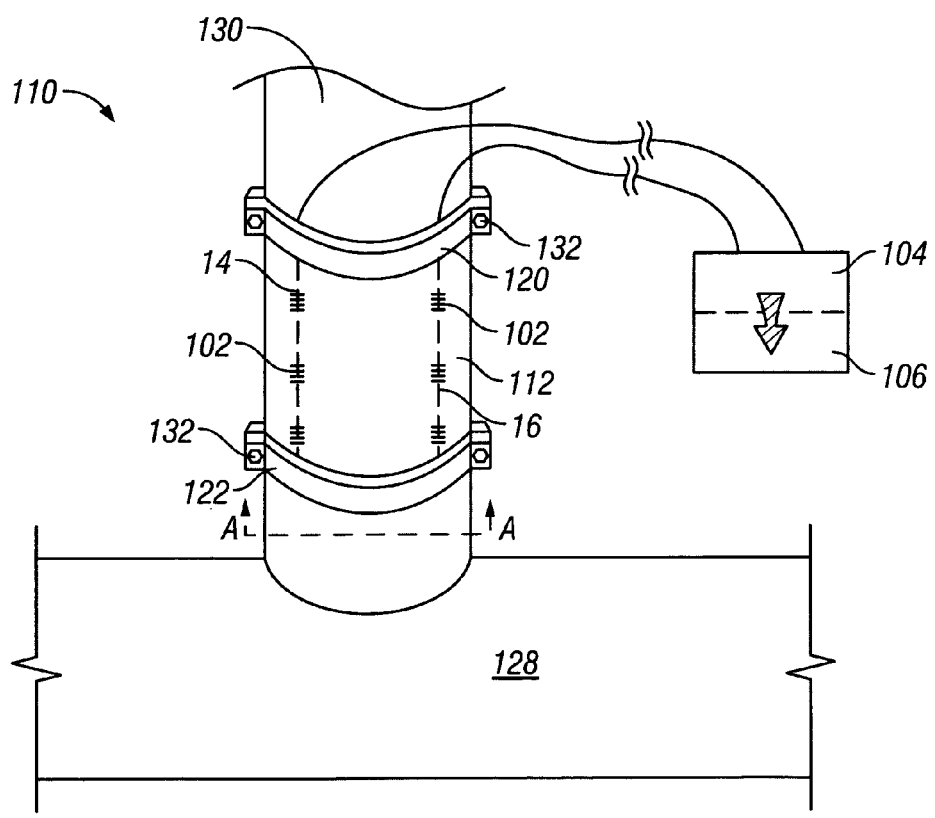
FIG. 9 is a diagrammatic representation of structural member joint monitoring apparatus according to a ninth embodiment of the invention.
Figure 10:
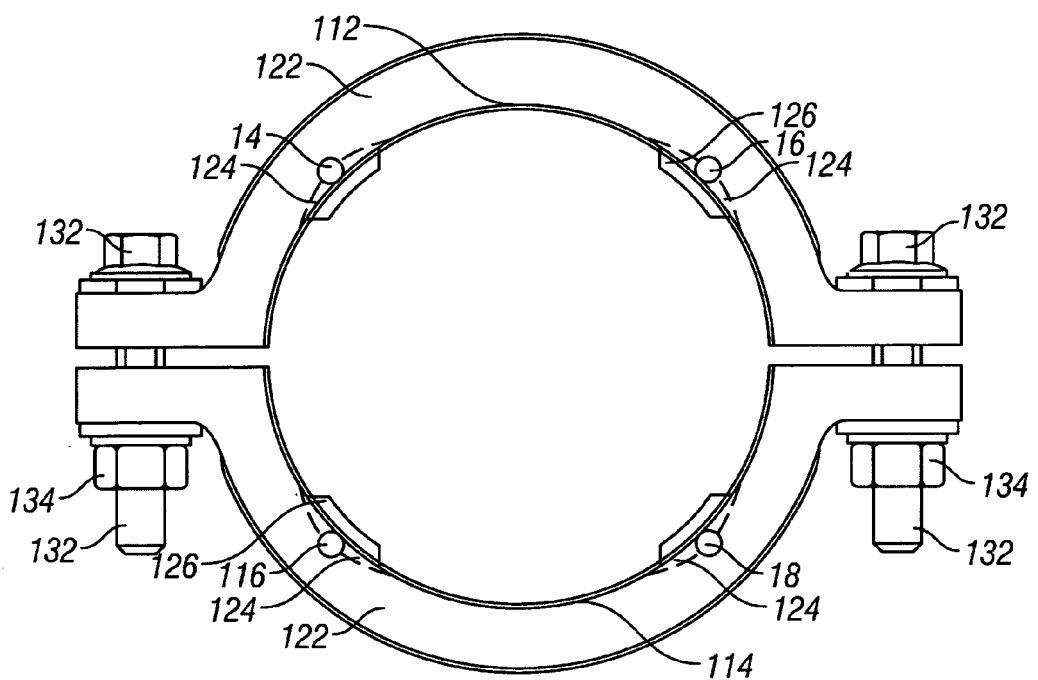
FIG. 10 is a diagrammatic end view in direction A-A of FIG. 9 of the structural member shape sensor apparatus of the joint monitoring apparatus of FIG. 9.

FIGS. 9 and 10 show structural member joint monitoring apparatus 110 according to a ninth embodiment of the invention. The joint monitoring apparatus 110 is substantially the same as the structural member shape measuring apparatus 100 of the previous embodiment, with the following modifications. The same reference numbers are retained for corresponding features.

In this embodiment, the sensor carrier apparatus takes the form of two approximately hemi-cylindrical shaped carrier members 112, 114, formed from E-glass, and two 2-part mechanical clamps 120, 122, fabricated from carbon fibre composite material. In use, the two shaped carrier members 112, 114 are mechanically coupled to the pipeline 130 by means of the clamps 120, 122 fixed around each end of the shaped carrier members 112, 114. The two parts of the clamps 120, 122 are held together by bolts 132, located through apertures formed in clamps 120, 122, and nuts 134.

Two optical fibres 14, 16 are provided on the first shaped carrier member 112 and two optical fibres 18, 116 are provided on the second shaped carrier member 114. The fibres 14, 16, 18, 116 are fixed onto the surface of the respective shaped carrier members 112, 114 by means of adhesive. The fibres 14, 16, 18, 116 extend generally longitudinally along the surfaces of their respective shaped carrier members 112, 114. Each optical fibre is provided with three FBG strain sensors 102, which are located at three axially spaced measurement locations, thereby forming three sets of bend radius sensor apparatus.

The clamps 120, 122 have recesses 124 formed in their internal surfaces, in which the fibres 14, 16, 18, 116 are received, in order to prevent the fibres being damaged by the clamps 120, 122.

A carbon fibre contact pad 126 is provided on the internal surface of each shaped carrier member 112, 114 at each end, in the area where the clamps 120, 122 are located, and underneath each fibre 14, 16, 18, 116. The contact pads 126 define the mechanical contact points between the shaped carrier members 112, 114 and the pipeline 130.

In this example, the FBG interrogation apparatus 104 and the processor means 106 are located remotely from the joint being monitored.

The structural member joint monitoring apparatus 110 is for use in monitoring the strain present across a joint between two, or more, structural members, such as a joint between a main (trunk) pipe 128 and a bypass (branch) pipe 130. By monitoring the shape of one pipe forming a joint, the strain conditions present within the joint may be determined. The processor means 106 of this example is additionally operable to determine the strain conditions within the joint from the shape measurement made of the branch pipe 130. This information may be used to determine the fatigue lifetime of the joint.

Various modifications may be made to the described embodiments without departing from the scope of the invention. A different number of FBG strain sensors may be used, and they may be provided within a different number of optical fibres to that described. The FBG strain sensors may have a different resonant wavelength and a different line width to those described, and it will be appreciated that the FBG strain sensors do not all have to be of the same resonant wavelength. The FBG strain sensors may be replaced by a different type of optical fibre strain sensor, including fibre Bragg grating Fabry-Perot etalons and optical fibre Fabry-Perot etalons. Where the gratings are described as having substantially the same resonant wavelength they may alternatively have different resonant wavelengths.

The optical fibres may be located at different distances from the neutral axis of the carrier rod or the structural member, and may alternatively or additionally be located at different angular positions around the surface of the carrier apparatus or the structural member.

The sensor carrier apparatus may comprise a carrier rod having a different cross-sectional shape to that described, and it will be appreciated that a carrier rod of any cross-sectional shape may be used Where more than one carrier rod is used a different number of carrier rods may be used to that described. The shaped carrier member or members may have a different shaped to those described, and a different number of shaped carrier members may be used. The hemi-cylindrical carrier members of the joint monitoring apparatus may be held together and coupled to a structural member using a different type of mechanical clamp, such a clam-shell type hinged clamp.

The carrier rods and the shaped carrier members may be fabricated from different materials to those described, including plastics materials.

The described embodiments provide various advantages, as follows. By monitoring the shape of sub-sea riser pipes, the location of the riser pipe can be determined and subsea obstructions, such as other riser pipes, can be avoided. The touchdown point of a sub-sea riser pipe (the point where the pipe meets the sea bed before following the contours of the sea bed) is often not well controlled and motion of the riser pipe can cause it to dig itself into a trench. The bend radius of the riser pipe can be reduced at this point where it exits the trench to head for the surface. The described apparatus can be used to monitoring the bend radius of a riser pipe at the touchdown point can identify when the radius of the pipe approaches critical levels. Fatigue information can also be obtained by measuring the change in bend radius or shape of a pipe. Fatigue analysis can help determine the remaining lifetime of a pipe. The described apparatus can also be used to monitor the shape and bend radius of subsea umbilicals (pipes carrying control fluids, communications and electrical power) and riser pipes consisting of a combination of both fixed and flexible sections.

Pipelines often have 'expansion loops' located along their length to allow for thermal expansion of the pipe. Expansion loops are a curved section of pipe that moves to accommodate the expansion of the rest of the pipe. These loops are particularly susceptible to fatigue and overbending. The described apparatus can be used to monitor the shape and bend radius of expansion loops.

The described apparatus enable strain measurements to be made which discriminate between axial strain and strain due to bending. Bending in one or more axes may be measured, thus allowing complex shapes to be determined.

It will be appreciated that the described embodiments are equally applicable to landbased pipelines, and to other structural members.

The invention claimed is:

1. A pipeline bend radius sensor apparatus comprising:
at least one optical fibres comprising a plurality of fibre grating strain sensors;
sensor carrier apparatus comprising at least one shaped carrier member, said at least one shaped carrier member is at least part-cylindrical in shape and has an internal surface and is flexible compared to the pipeline to which it is to be coupled, and said fibre grating strain sensors are embedded within said at least one shaped carrier member or are provided on a surface of said at least one shaped carrier member at a plurality of measurement locations, and
coupling apparatus for mechanically coupling said at least one shaped carrier member to the pipeline to be measured, said coupling apparatus comprising mechanical clamp apparatus and a plurality of contact pads, with said mechanical clamp apparatus provided at at least one clamp location on said shaped carrier member, and said contact pads are provided on said internal surface of said shaped carrier member within said at least one clamp location,
with said sensor carrier apparatus arranged such that said fibre grating strain sensors are located at different angular positions around the periphery of the pipeline and at different distances from the neutral axis of the pipeline, whereby the bend radius or the bend radii of the pipeline can be measured.

2. The apparatus as claimed in claim 1, wherein the sensor carrier apparatus comprises two substantially hemi-cylindrical shaped carrier members.

3. The apparatus as claimed in claim 1, wherein each shaped carrier member is constructed from a composite material.

4. The apparatus as claimed in claim 1, wherein the fibre grating strain sensors are provided on the er-cach shaped carrier member at a plurality of locations spaced across the each shaped carrier member.

5. The apparatus as claimed in claim 1, wherein the fibre grating strain sensors are embedded within the each shaped carrier member or are provided on a surface of the each shaped carrier member.

6. The apparatus as claimed in claim 1, wherein said fibre grating strain sensors include a fibre Bragg grating or a fibre Bragg grating Fabry-Perot etalon, or an optical fibre Fabry-Perot etalon.

7. A pipeline shape sensor apparatus comprising:
a plurality of structural member bend radius sensor apparatus, each bend radius sensor apparatus located at a different position along a structural member;
each bend radius sensor apparatus comprising: at least one optical fibre comprising a plurality fibre grating strain sensors; sensor carrier apparatus comprising at least one shaped carrier member, said at least one shaped carrier member is at least part-cylindrical in shape and has an internal surface and is flexible compared to the pipeline to which it is to be coupled, and said fibre grating strain sensors are embedded within said at least one shaped carrier member or are provided on a surface of said at least one shaped carrier member at a plurality of measurement locations, and coupling apparatus for mechanically coupling said at least one shaped carrier member to the pipeline to be measured, said coupling apparatus comprising mechanical clamp apparatus and a plurality of contact pads, with said mechanical clamp apparatus provided at at least one clamp location on said shaped carrier member, and said contact pads are provided on said internal surface of said shaped carrier member within said at least one clamp location, with said sensor carrier apparatus arranged such that said fibre grating strain sensors are located at different angular positions around the periphery of the pipeline and at different distances from the neutral axis of the pipeline, whereby the bend radius or the bend radii of the pipeline can be measured.

8. The apparatus as claimed in claim 7, wherein a single shaped carrier member or a single set of shaped carrier members is used to carry the at least one optical fibres for each of the plurality of bend radius sensor apparatus.

9. A pipeline bend radius measurement apparatus comprising:
a pipeline bend radius sensor apparatus;
an optical fibre strain sensor interrogation apparatus to which a plurality of the optical fibre strain sensors are optically coupled, the interrogation apparatus being operable to optically interrogate the optical fibre strain sensors; and
the bend radius sensor apparatus comprising:
at least one optical fibre comprising a plurality fibre grating strain sensors; sensor carrier apparatus comprising at least one shaped carrier member, said at least one shaped carrier member is at least part-cylindrical in shape and has an internal surface and is flexible compared to the pipeline to which it is to be coupled, and said fibre grating strain sensors are embedded within said at least one shaped carrier member or are provided on a surface of said at least one shaped carrier member at a plurality of measurement locations, and coupling apparatus for mechanically coupling said at least one shaped carrier member to the pipeline to he measured, said coupling apparatus comprising mechanical clamp apparatus and a plurality of contact pads, with said mechanical clamp apparatus provided at at least one clamp location on said shaped carrier member, and said contact pads are provided on said internal surface of said shaped carrier member within said at least one clamp location, with said sensor carrier apparatus arranged such that said fibre grating strain sensors are located at different angular positions around the periphery of the pipeline and at different distances from the neutral axis of the pipeline, whereby the bend radius of the structural member can be measured.

10. The apparatus as claimed in claim 9, wherein the interrogation apparatus is further operable to convert measured strains into a bend radius.

11. The apparatus as claimed in claim 9, wherein the interrogation apparatus is located locally to the bend radius sensor apparatus, being attached to the sensor carrier apparatus.

12. The pipeline shape sensor apparatus of claim 7, further comprising a structural member joint monitoring apparatus, provided on at least one structural member of a joint to be monitored, the structural member joint monitoring apparatus further comprising: an optical fibre strain sensor interrogation apparatus to which the fibre grating strain sensors are optically coupled, the interrogation apparatus being operable to optically interrogate the fibre grating strain sensors and to convert measured strains into bend radii, and the interrogation apparatus being further operable to convert the bend radii into the shape of the structural member and, from the shape of the structural member, to calculate the strain present across the joint.

13. The apparatus as claimed in claim 12, wherein the pipeline is a subsea pipeline.

14. The apparatus as claimed in claim 3, wherein each shaped carrier member is constructed from glass fibre or carbon fibre in epoxy resin or polyester resin or from a plastics material.

15. The apparatus as claimed in claim 13, wherein the subsea pipeline is a sub-sea oil pipeline or a gas pipeline.

* * * * *

UNITED STATES PATENT AND TRADEMARK OFFICE
CERTIFICATE OF CORRECTION

PATENT NO. : 7,646,945 B2  
APPLICATION NO. : 10/993952  
DATED : January 12, 2010  
INVENTOR(S) : Jones et al.

Page 1 of 1

It is certified that error appears in the above-identified patent and that said Letters Patent is hereby corrected as shown below:

ON THE TITLE PAGE:

Insert Foreign Application Priority Data as follows:  
Item --(30) Foreign Application Priority Data  
Aug. 27, 2004 (EP) ............................................. 04255194.5--

Signed and Sealed this
Thirty-first Day of May, 2011

David J. Kappos
*Director of the United States Patent and Trademark Office*